W. H. GRANT.
Plows for Covering Corn.

No. 155,080. Patented Sept. 15, 1874.

Witnesses
W. Bradford

Inventor
W. H. Grant
D. P. Holloway & Co

UNITED STATES PATENT OFFICE.

WILLIAM H. GRANT, OF HIGH GROVE, KENTUCKY.

IMPROVEMENT IN PLOWS FOR COVERING CORN.

Specification forming part of Letters Patent No. 155,080, dated September 15, 1874; application filed July 21, 1873.

*To all whom it may concern:*

Be it known that I, WILLIAM H. GRANT, of High Grove, in the county of Nelson and State of Kentucky, have invented certain new and useful Improvements in Plows for Covering Corn and other Grains and Seeds; and I do hereby declare that the following is a full, clear, and exact description of the same, reference being had to the accompanying drawings, which form a part of this specification, and in which—

Figure 1:
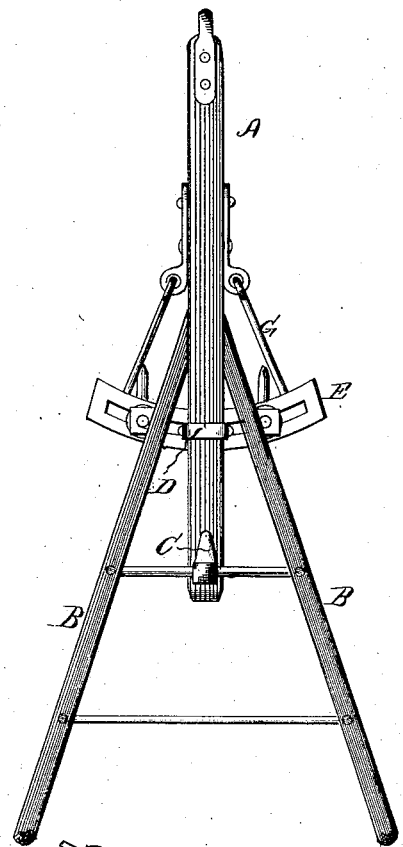
Figure 2:
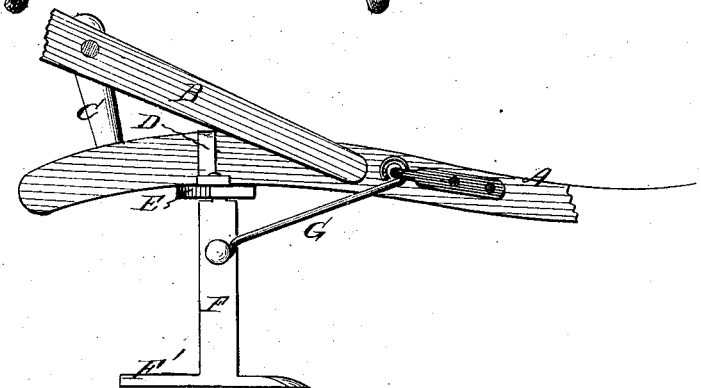
Figure 3:
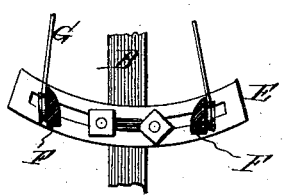

Figure 1 is a plan view of my improved implement, showing the beam, the handles, a slotted plate in which the covering bars or shares can be adjusted, and the braces for holding the shares. Fig. 2 is a sectional elevation, showing the beam, brace, shares, and the manner of uniting the same; and Fig. 3 is a bottom view, showing a portion of the beam and of the braces, together with the slotted plate, and a section of the beveled bars which constitute the shares for causing the earth to be moved over and to cover the corn.

Corresponding letters refer to corresponding parts in the several figures.

This invention relates to an implement which I have denominated a plow, and which is designed for covering corn and other grains and seeds after they have been dropped in the proper positions; and it consists in the combination of certain of its parts, as will be more fully described hereinafter.

In constructing implements of this character, I use a frame, A, which is provided with any suitable form of clevis upon its front end, and has handles, B B, attached to it in any suitable manner, which handles may, if desirable, be supported by a brace, C, extending from the rod which unites the handles to a point near the rear end of the beam. At about the point indicated in Fig. 2 of the drawing there is placed a clip, D, the lower ends of which pass through a plate, E, and secure the same to the beam A by means of nuts, which are secured upon the ends of the clip beneath said plate.

The plate E above alluded to is bent or otherwise formed into the segment of a circle, and is provided with slots of the same form, in order that the bars or shares soon to be described may be adjusted therein without disconnecting the braces which support them therefrom or from the beam.

The adjustable bars or shares F F consist of vertical, or nearly vertical, bars of metal, having upon their lower ends transverse bars, F', for the purpose of sustaining the weight of the implement, and for the further purpose of loosening the earth in advance of the shares, in order that they may the more effectually cover the grain.

The vertical portions F of the shares are beveled upon their inner surfaces, as shown in Fig. 3, in order that the earth which passes between them may have the proper direction given to it, and be caused to fall upon and cover the corn or other seeds. This bevel should extend from the outer front edge of the share to, or nearly to, the inner rear corner or edge, by which means the earth will have an inward movement imparted to it as it passes between the shares, and will be lodged in the center of the space between said shares, which is the point where the seed to be covered is to be placed.

The upper ends of the vertical portions F of the shares are to be provided with necks or projections, which fit into the slots formed in the plate E, and with thread for the reception of nuts.

The shares can be adjusted laterally on the curved plate E, so that they may be brought nearer to each other for covering small grain or seeds, or carried farther apart for covering larger kinds of grain or seeds, such as corn and potatoes.

These shares are supported by means of braces G G, the forward ends of which are hinged to eyes secured to the beam A, while their rear ends are attached to the vertical portions of the share, so that as said shares are moved for the purpose of adjustment the braces may move with them.

Having thus described my invention, what I claim, and desire to secure by Letters Patent, is—

The combination, in an implement for covering corn and seeds, of a beam, A, curved and slotted plate E, beveled and adjustable shares or bars F, and brace G, the parts being constructed and arranged substantially as and for the purpose set forth.

In testimony whereof I have signed my name to this specification in the presence of two subscribing witnesses.

W. H. GRANT.

Witnesses:
  T. E. C. BRINLY,
  WM. H. HERMAN.